UNITED STATES PATENT OFFICE 2,599,564

ESTERS OF POLYGALACTURONIC ACID METHYLGLYCOSIDE AND SALTS THEREOF

John Lee, Essex Fells, and Leo Berger, Nutley, N. J., assignors to Hoffmann-La Roche Inc., Roche Park, Nutley, N. J., a corporation of New Jersey No Drawing. Application February 25, 1950, Serial No. 146,394

8 Claims. (Cl. 260—209.5)

This invention relates to improvements in the production of novel polygalacturonic acid methylglycoside sulfuric acid esters. The products have useful properties. For example, they exhibit anticoagulant properties, and are particularly suitable for therapeutic purposes, as well as for laboratory testing uses where blood coagulation must be inhibited.

We have found that polygalacturonic acid methylglycoside methylester, upon treatment with chlorosulfonic acid, produces derivative polysulfuric acid esters having a high degree of heparin-like activity and practically no toxicity. The sulfated products, in the form of the sodium salt, are particularly useful for intramuscular, subcutaneous, or intravenous injection. Polygalacturonic acid methylglycoside methylester, more simply identified in the art as M. P. M. E., is a material whose preparation from pectin has been disclosed in the literature. Jansen et al., Arch. Biochem. 21 (1949) pages 149-157; Morrell et al., J. Biol. Chem., 105 (1934) pages 1-13. It is preferred to purify the polygalacturonic acid methylglycoside methylester, as, for example, by dialyzing it against water according to the procedure shown in the Jansen et al. article, supra. By treatment of a purified material polysulfuric acid esters may be obtained, with, e. g., 15.6 per cent sulfur, which are fully as active in vivo as heparin, and whose activity is of longer duration than that of heparin. Furthermore, the material is characterized by being practically atoxic and free from local irritation on injection. We have also found that the polygalacturonic acid methylglycoside may be sulfated in the non-ester condition, so as to produce polysulfuric acid esters of polygalacturonic acid methylglycoside. The sulfuric acid ester of the methylglycoside, so obtained, is fully active and is also characterized by low toxicity. The polysulfuric acid ester of polygalacturonic acid methylglycoside may also be obtained by hydrolysis of the polysulfuric acid ester of polygalacturonic acid methylester methylglycoside. The hydrolysis can be readily effected by means, for example, of sodium hydroxide. The hydrolysis may be complete or partial according to the length of time and the temperature at which the hydrolyzing agent is allowed to act. It will be apparent, therefore, that products may be produced which carry free carboxyl groups as well as carbomethoxy groups.

It is preferable to accomplish a high degree of sulfation so that the hydroxyl groups are substantially all converted to corresponding sulfuric acid ester attachments.

While in general the sodium salts of the sulfuric acid esters of the polygalacturonic acid methylglycoside methylester and of the polygalacturonic acid methylglycoside are suitable for parenteral use, other salts may also be prepared, such as those of primary amines, e. g., ethylamine; secondary amines, e. g., diethylamine or diethanolamine; tertiary amines, e. g., pyridine or triethylamine or 2-dimethylaminomethyl-dibenzofuran; aliphatic diamines, e. g., decamethylenediamine; and aromatic diamines, can be prepared. Some of these are soluble in water, others are soluble in saline solution, and still others are insoluble and can be used for purposes of preparing suspensions for injection. Furthermore, as well as the sodium salt, those of the alkali metals, such as potassium and lithium; of ammonia; and of the alkaline earth metals, such as calcium or magnesium, may be employed. It will be apparent, therefore, that these salts embrace, in general, derivatives of salt-forming cations.

The following examples illustrate our invention, and disclose methods for preparing our novel compounds. The first example illustrates the preparation of polysulfuric acid ester of polygalacturonic acid methylglycoside methylester. The second and third examples disclose methods of preparing polysulfuric acid ester of polygalacturonic acid methylglycoside. The fourth example discloses the preparation of polysulfuric acid ester of polygalacturonic mixed acid-methylester methylglycoside. It will be apparent from these examples and the disclosure herein, that variations may be made in the salts produced, the degree of esterification, molecular weight, the conditions of reaction, and the like.

Example 1

A mixture of chlorosulfonic acid and pyridine is prepared at 0° to +5° C. by the careful addition of 280 cc. of chlorosulfonic acid to 1400 cc. of dry pyridine. The mixture is then heated to 70-75° C., and under constant stirring 40 grams of polygalacturonic acid methylglycoside methylester are added rapidly. The reaction mixture is stirred at 70-75° for 3 hours, and then poured into 6 liters of methanol with stirring. A crude pyridine salt separates and is twice washed with methanol by suspension and decantation and finally collected by means of centrifuging. The salt is dried in vacuo over anhydrous calcium chloride to yield about 97 grams of crude white hygroscopic pyridine salt. The salt is purified by dissolving in 380 cc. of water at 25°, and centrifuging off a small amount of insoluble gum.

The pure pyridine salt is isolated by the addition of the aqueous solution to 5 liters of ethanol. The purified pyridine salt may be converted to the sodium salt by dissolving in water and adjusting the pH of the solution to 9.5 to 10.0 per cent sodium hydroxide and rapid addition to 5 volumes of methanol with stirring for precipitation. The precipitate is collected by centrifugation, and the salt is washed several times in the centrifuge cups with methanol and finally with acetone. It is then dried in vacuo over anhydrous calcium chloride. The product is the sulfuric acid ester of polygalacturonic acid methylglycoside methylester in the form of a sodium salt having about 15.4 per cent sulfur and 11.3 per cent of sodium when analyzed on a dry basis.

The pyridine salt may also be used for the preparation of other salts of the sulfated polygalacturonic acid methylglycoside methylester, as, e. g., potassium or lithium salt, by simply using the appropriate base and following the procedure set forth in this example for the preparation of the sodium salt.

The sodium salt is particularly useful for the preparation of salts of sulfated polygalacturonic acid methylglycoside methylester that are slightly soluble in water or very insoluble in water; e. g., the decamethylenediamine salt is prepared by the addition of a solution of decamethylenediamine acetate in aqueous methanol to an aqueous methanolic solution of the sodium salt of sulfated polygalacturonic acid methylglycoside methylester, to yield the decamethylenediamine salt of sulfated polygalacturonic acid methylglycoside methylester, which is very slightly soluble in water but completely soluble in physiological saline solution; or the 2-dimethylaminomethyl-dibenzofuran salt may be prepared by mixing an aqueous solution of the sodium salt of sulfated polygalacturonic acid methylglycoside methylester and an aqueous solution of 2-dimethylaminomethyl-dibenzofuran hydrochloride. The salt separates instantly as a white precipitate that is not soluble in water or a 1 per cent saline solution.

Example 2

To a solution containing 22.5 grams of polygalacturonic acid methylglycoside methylester in 400 cc. of water are added 55 cc. of 6 N sodium hydroxide and the reaction mixture is left to stand for 1½ hours at room temperature with occasional stirring. The pH of the mixture is then adjusted to 1.0 with excess 6 N hydrochloric acid, diluted 1 to 4 with water. After standing at room temperature for one hour, the solution is poured into one volume of ethyl alcohol and the milky precipitate collected by centrifugation. For purification, the resultant precipitate is redissolved in 2400 cc. of water and filtered through a diatomaceous earth filter matte, e. g., Celite, and added to one volume of ethyl alcohol (made slightly acidic with a drop of concentrated hydrochloric acid) with stirring. The white precipitate is collected by centrifuging and dried in vacuo. The product is polygalacturonic acid methylglycoside obtained as a fine white dry powder. For the further treatment of this material, a solution of 105 cc. of chlorosulfonic acid and 525 cc. of dry pyridine is prepared at 0° C. and warmed to 75°. Then 13.5 grams of the polygalacturonic acid methylglycoside is added to the well stirred solution. The reaction solution is maintained at 70–75° for 3 hours and then added to 2.5 liters of methanol while still warm. The pyridine salt of sulfated polygalacturonic acid methylglycoside that separates is collected by centrifuging and washed twice with methanol and once with acetone in the centrifuge cups and finally dried in vacuo. There is thus obtained a crude pyridine salt of the sulfated polygalacturonic acid methylglycoside, which is then purified following the procedure shown in Example 1. The purified pyridine salt can be converted to the sodium salt by treatment with sodium hydroxide, as shown in Example 1. The sodium salt of the sulfated polygalacturonic acid methylglycoside is a tan powder having 15.6 per cent sodium and 14.1 per cent sulfur. Other salts of the sulfated polygalacturonic acid methylglycoside may be prepared in a manner similar to that disclosed in Example 1.

Example 3

10 grams of the sodium salt of sulfated polygalacturonic acid methylester methylglycoside are dissolved in 250 cc. of water and 25 cc. of 5 N sodium hydroxide are added. The solution is then set aside at room temperature for 3 hours, after which it is added to 5 volumes of methanol. The salt that separates is collected via centrifugation and washed twice with methanol and finally dried in vacuo over anhydrous calcium chloride to yield 10 grams of hydrolyzed product. The hydrolyzed salt contains 14 per cent sulfur and 15.5 per cent sodium. The product corresponds to that obtained in Example 2.

Example 4

10 grams of the sodium salt of sulfated polygalacturonic acid methylglycoside methylester are dissolved in 250 cc. of 0.5 normal sodium hydroxide, and the solution is then set aside at room temperature (25° C.) for 30 minutes after which it is added to five volumes of methanol with stirring. The salt that separates is collected by centrifuging and washed twice with methanol and once with acetone and finally dried over anhydrous $CaCl_2$ to yield ca. 10 g. of hydrolyzed product. The salt obtained had 12.5 per cent sodium and 14.1 per cent sulfur and is a mixed sulfate of polygalacturonic acid methylglycoside and polygalacturonic acid methylglycoside methylester. By alternation of the pH, time, and temperature of contact with the alkali, various mixtures of sulfated polygalacturonic acid methylglycoside and polygalacturonic acid methylglycoside methylester are obtained.

We claim:

1. As a substantially non-toxic blood anticoagulant, a compound selected from the group consisting of substantially fully sulfated polygalacturonic acid methylglycoside, substantially fully sulfated polygalacturonic acid methylester methylglycoside, salts of substantially fully sulfated polygalacturonic acid methylglycoside, and salts of substantially fully sulfated polygalacturonic acid methylester methylglycoside.

2. As a substantially non-toxic blood anticoagulant, substantially fully sulfated polygalacturonic acid methylglycoside.

3. As a substantially non-toxic blood anticoagulant, substantially fully sulfated polygalacturonic acid methylester methylglycoside.

4. A substantially non-toxic blood anticoagulant composition comprising a salt of substantially fully sulfated polygalacturonic acid methylglycoside.

5. A substantially non-toxic blood anticoagulant composition comprising a salt of substantially fully sulfated polygalacturonic acid methylester methylglycoside.

6. A substantially non-toxic blood anticoagulant composition comprising a sodium salt of substantially fully sulfated polygalacturonic acid methylglycoside.

7. A substantially non-toxic blood anticoagulant comprising an alkali metal salt of substantially fully sulfated polygalacturonic acid methylester methylglycoside.

8. A substantially non-toxic blood anticoagulant composition comprising a sodium salt of substantially fully sulfated polygalacturonic acid methylester methylglycoside.

JOHN LEE
LEO BERGER.

REFERENCES CITED

The following references are of record in the file of this patent:

UNITED STATES PATENTS

| Number | Name | Date |
|---|---|---|
| 2,284,566 | Elsner | May 26, 1942 |
| 2,508,433 | Snyder | May 23, 1950 |

OTHER REFERENCES

Karrer et al., Helv. Chim. Acta, v. 26 (1943), p. 1297, 1298, 1300, 1301; 4 pages.

Jansen et al., Arch Biochem., v. 21 (1949), p. 149–157; 9 pages.

Von Kaulla et al., Chem. Abs., v. 44 (1950), p. 3914 g.